(12) United States Patent
Burcham et al.

(10) Patent No.: US 8,684,787 B1
(45) Date of Patent: Apr. 1, 2014

(54) RATTLE CALL

(75) Inventors: Gregory S. Burcham, Hartselle, AL (US); John Woller, Sr., Decatur, AL (US)

(73) Assignee: EBSCO Industries, Inc., Birmingham, AL (US)

( * ) Notice: Subject to any disclaimer, the term of this patent is extended or adjusted under 35 U.S.C. 154(b) by 766 days.

(21) Appl. No.: 12/571,429

(22) Filed: Sep. 30, 2009

Related U.S. Application Data

(63) Continuation-in-part of application No. 29/340,050, filed on Jul. 13, 2009, now Pat. No. Des. 616,320, and a continuation-in-part of application No. 29/340,146, filed on Jul. 14, 2009, now Pat. No. Des. 618,573.

(60) Provisional application No. 61/108,274, filed on Oct. 24, 2008.

(51) Int. Cl.
*A63H 5/00* (2006.01)

(52) U.S. Cl.
USPC .......................................... 446/418; 446/397

(58) Field of Classification Search
USPC .................. 446/397, 418, 421; 84/402, 410
See application file for complete search history.

(56) References Cited

U.S. PATENT DOCUMENTS

| | | | | |
|---|---|---|---|---|
| 1,034,307 | A | * | 7/1912 | Saunders ....................... 446/417 |
| 2,025,181 | A | * | 12/1935 | Nicholas ....................... 446/397 |
| 2,643,483 | A | * | 6/1953 | Walker .......................... 446/397 |
| 3,019,553 | A | | 2/1962 | Gomez, et al. |
| 3,208,184 | A | * | 9/1965 | Wisor ........................... 446/397 |
| 3,490,410 | A | * | 1/1970 | Crawford, Sr. ............. 116/67 R |
| 4,610,641 | A | | 9/1986 | Allen |
| 4,648,852 | A | * | 3/1987 | Wingate ........................ 446/397 |
| 4,850,928 | A | | 7/1989 | Stewart |
| D309,120 | S | | 7/1990 | Stewart |
| 5,019,008 | A | | 5/1991 | Hughes |
| 5,207,769 | A | | 5/1993 | Malta |
| 5,334,074 | A | * | 8/1994 | Suminski ...................... 446/418 |
| D371,401 | S | | 7/1996 | Nielsen et al. |
| 5,555,664 | A | | 9/1996 | Shockley |
| D376,555 | S | | 12/1996 | Gebhardt |
| 5,947,353 | A | | 9/1999 | Johnson |
| 5,988,469 | A | | 11/1999 | Musacchia |
| 6,003,261 | A | * | 12/1999 | French .............................. 43/1 |
| 6,234,865 | B1 | | 5/2001 | Battey |

(Continued)

OTHER PUBLICATIONS

Knight & Hale Rack Attack, retrieved from the internet on the Sportsman's Zone web page: www.sportsmanszone.com/store-products-2545-Knight--Hale-Rack-Attack_3129914.

*Primary Examiner* — Gene Kim
*Assistant Examiner* — Alyssa Hylinski
(74) *Attorney, Agent, or Firm* — Robert J. Veal

(57) ABSTRACT

A rattle call for use in luring an antler-bearing game animal to a desired location includes a rib bearing sound member and a knob bearing sound member. The rib bearing sound member includes a rib plate with an upper side and a lower side, a receiving handle or sound chamber connected to the lower side of the plate, and a plurality of ribs extending from the upper side of the first plate. The knob bearing member includes a knob plate with an upper side and a lower side, an engaging handle connected to the first side of the knob plate, and a plurality of knobs extending from the upper side of the knob plate in a position complementary to the plurality of ribs on the first plate for generating a rattle sound when the ribs contact the knobs.

21 Claims, 22 Drawing Sheets

(56) References Cited

U.S. PATENT DOCUMENTS

| | | |
|---|---|---|
| 6,289,626 B1 | 9/2001 | Williams |
| 6,328,626 B1 | 12/2001 | Eubanks |
| 6,599,168 B1 * | 7/2003 | Weaver .................. 446/397 |
| 6,749,099 B2 | 6/2004 | Danielson |
| 6,769,211 B1 | 8/2004 | Baisden |
| 6,902,463 B2 | 6/2005 | Vaicunas et al. |
| 7,001,238 B1 * | 2/2006 | Gonzalez .................. 446/418 |
| 7,281,966 B2 * | 10/2007 | McQueen .................. 446/421 |
| D616,320 S * | 5/2010 | Burcham et al. .......... D10/119.1 |
| D618,573 S * | 6/2010 | Burcham et al. .......... D10/119.1 |
| 2002/0058457 A1 * | 5/2002 | Butler .................. 446/200 |
| 2004/0244152 A1 | 12/2004 | Place |
| 2007/0178802 A1 * | 8/2007 | Knight .................. 446/397 |
| 2008/0318488 A1 * | 12/2008 | Castner .................. 446/26 |

* cited by examiner

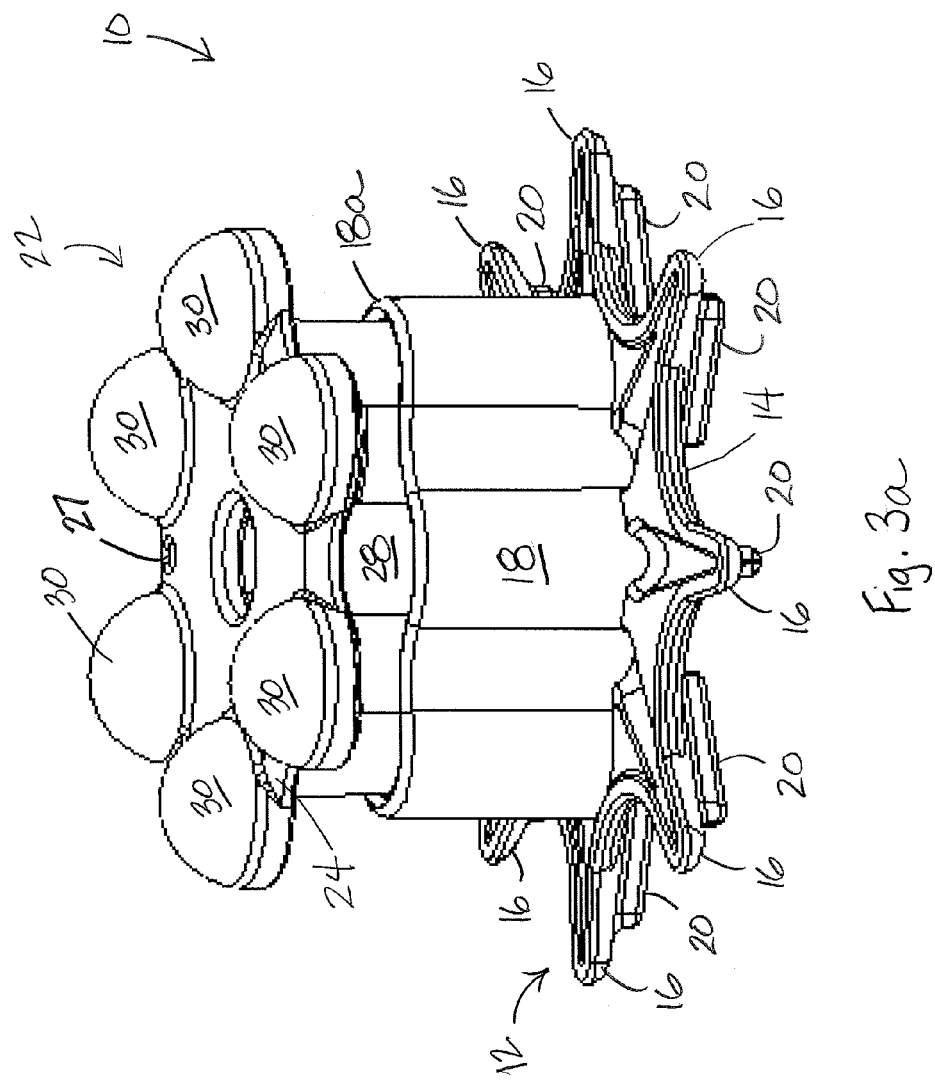

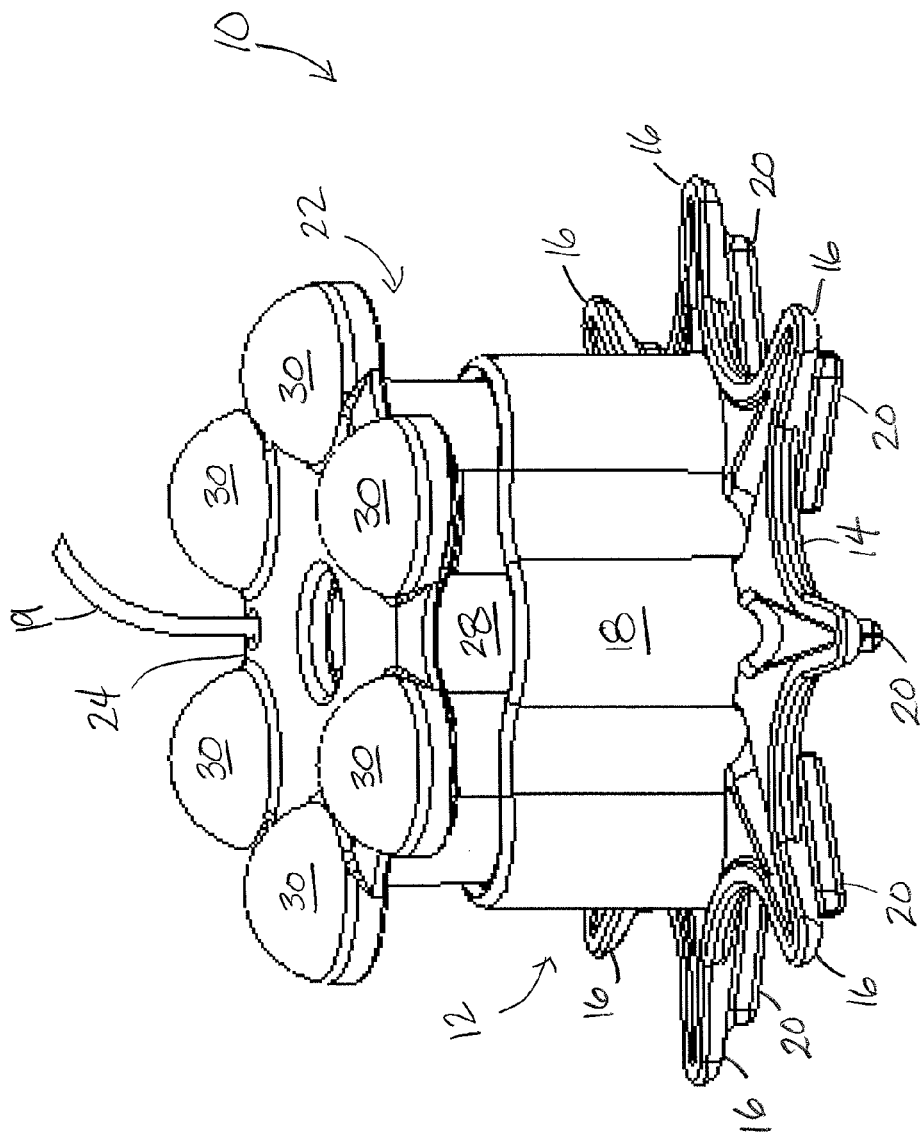

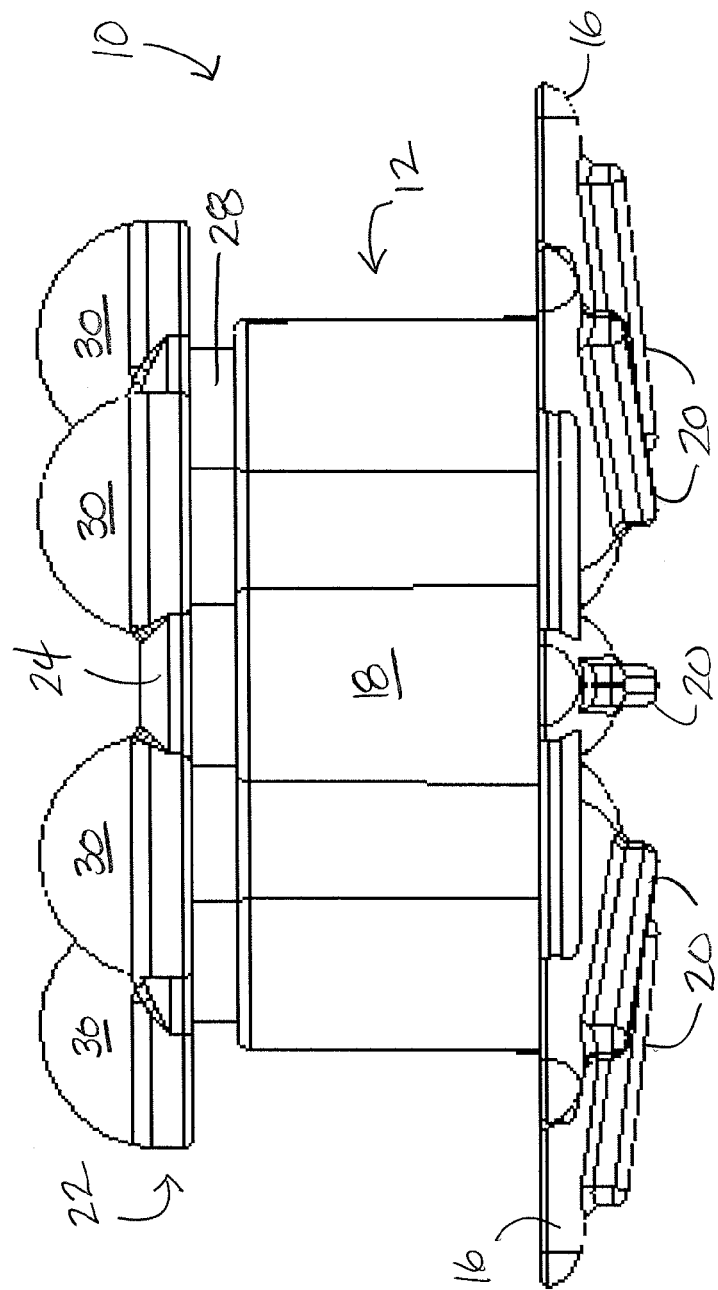

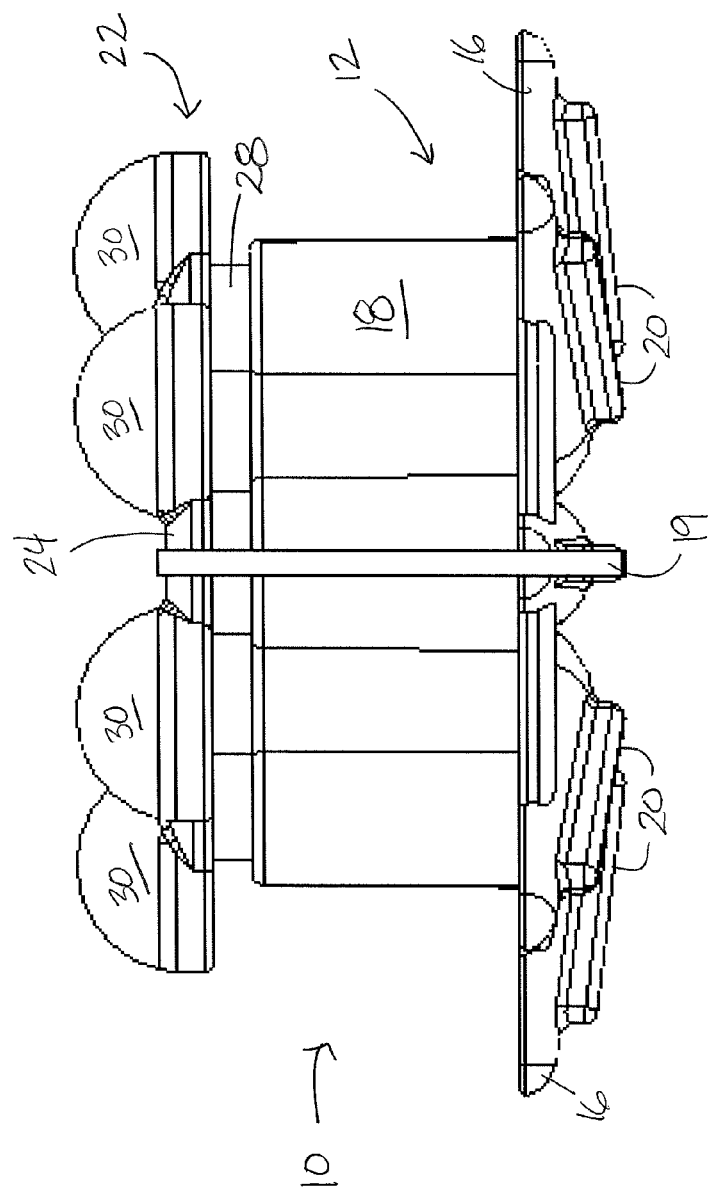

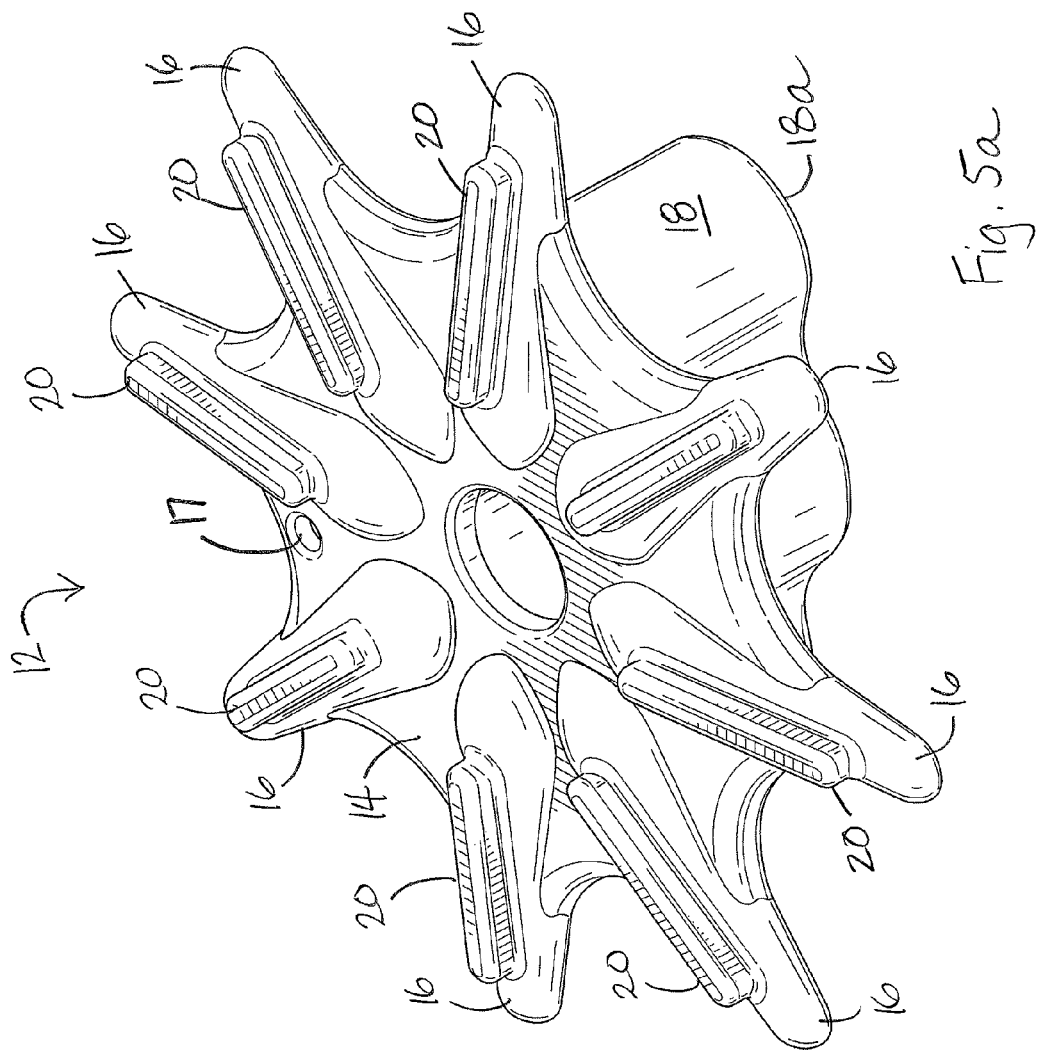

RATTLE CALL

CROSS REFERENCE TO RELATED PATENT APPLICATIONS

This application claims priority from U.S. Provisional Application Ser. No. 61/108,274, filed on Oct. 24, 2008, and is a continuation-in-part of Design patent application Nos. 29/340,050, filed on Jul. 13, 2009 now U.S. Pat. No. Des. 616,320, and 29/340,146, filed on Jul. 14, 2009 now U.S. Pat. No. Des. 618,573, each said application being relied upon and incorporated herein by reference.

BACKGROUND OF THE INVENTION

There are various known methods for attracting antler-bearing animals by reproducing or simulating the sound of two deer sparring. In sparring, antler-bearing animals fight with their antlers and foreheads to determine which buck earns the right to the herd and access to reproduction. The sound of antlers rattling can be performed manually by holding an antler in one hand and clashing or lightly striking it into another antler held in the other hand. While actual antlers may be used, numerous varieties of synthetic antlers have been suggested.

Examples of devices used to call antler-bearing animals include U.S. Pat. No. 4,850,928 (the '928 patent) and U.S. Pat. No. 4,610,641 (the '641 patent), which disclose the use of synthetic antlers. The '928 patent provides that, it was noted that hunters will use actual antlers, normally white and weathered from long exposure to the elements, and/or synthetic antlers to attract deer, elk and the like. However, the '928 patent further noted that it is difficult to reproduce the sound of animal antlers utilizing synthetic materials or the actual antlers. In the '641 patent, it was noted that "hunters have known for some time that when deer or elk are in the mating season, bucks take part in a ritual wherein they butt or clash their antlers together." As a result of this ritual, sounds are created which attract other deer or elk, including both bucks and does, to the scene. Hunters have attempted to take advantage of this phenomena by using antlers from previous prizes to simulate the sound of this ritual. The common practice is to cut the horns from the prize, and to clean and sand the horns. The horns are then raked and clashed with one another in order to produce a sound which imitates bucks fighting in the mating ritual.

Hunters have had considerable success with these techniques. However, deer or elk antlers have certain disadvantages when used by man to attract animals. The antlers tend to lose their "live" sound over time. To overcome this, hunters will treat or tune the antlers in an attempt to regain the original sound. Such efforts may involve soaking the antlers in water every two or three days or treating the antlers with linseed oil to keep them from becoming chalky. In addition, the severed antlers do not exhibit stability during varying weather conditions and may produce ineffective sounds depending on the weather.

Another commonly used means of simulating the sound of antlers rattling is to place a number of wooden rods in a cloth bag and to strike the bag against an object to cause the clacking sound of antlers rattling. The latter, use of a rattle bag or rattle sack, is growing in popularity; however, merely placing a set of wooden rods in a cloth bag does not provide a realistic acoustic simulation of the sound of animals "rattling" their antlers together. Furthermore, such a design is hard to control when the hunter is moving from location to location, and could therefore generate noise at an undesired time that could spook the animal, thereby defeating the purpose of the product.

BRIEF SUMMARY OF THE INVENTION

A rattle call for use in luring an antler-bearing game animal to a desired location includes a rib bearing sound member and a knob bearing sound member. The rib bearing sound member includes a rib plate with an upper side and a lower side, a primary or receiving handle or sound chamber connected to the lower side of the plate, and a plurality of ribs extending from the upper side of the first plate. The knob bearing member includes a knob plate with an upper side and a lower side, a secondary or engaging handle connected to the first side of the knob plate, and a plurality of knobs extending from the upper side of the knob plate in a position complementary to the plurality of ribs on the first plate for generating a rattle sound when the ribs contact the knobs.

In operation, the user will engage the primary handle of the rib bearing sound member with one hand and the secondary handle of the knob bearing sound member with the second hand. The user will draw the upper surface of the rib plate and the upper surface of said knob plate into engagement such that at least one rib of the plurality of ribs will contact at least one of the protrusions to generate a desired noise mimicking the contact made by the antler bearing game animals. This contact can be in a lateral direction or a rotational direction as desired by the user to generate the preferred noise.

BRIEF DESCRIPTION OF THE DRAWINGS

FIGS. 3a and 3b are perspective views of the buck rattle call with the knob bearing member nested in the rib bearing member;

FIGS. 4a and 4b are side elevational views of the buck rattle call with the knob bearing member nested in the rib bearing member;

FIG. 5a is an upper perspective view of the rib bearing member;

FIGS 8 and 9 have been omitted.

DESCRIPTION OF THE INVENTION

Figure 1:
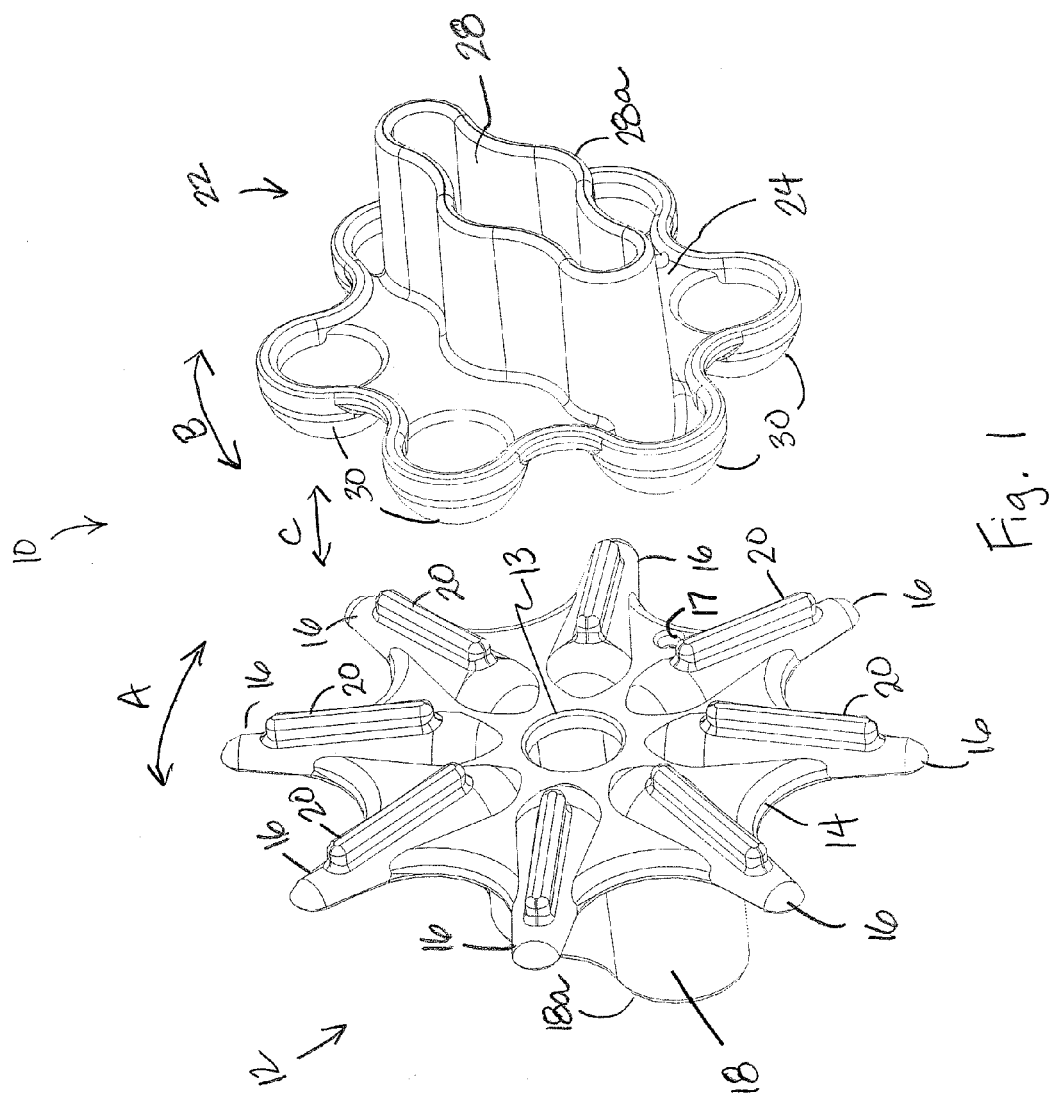
FIG. 1 is a perspective view of a buck rattle call having a knob bearing member and a rib bearing member.
Figure 2:
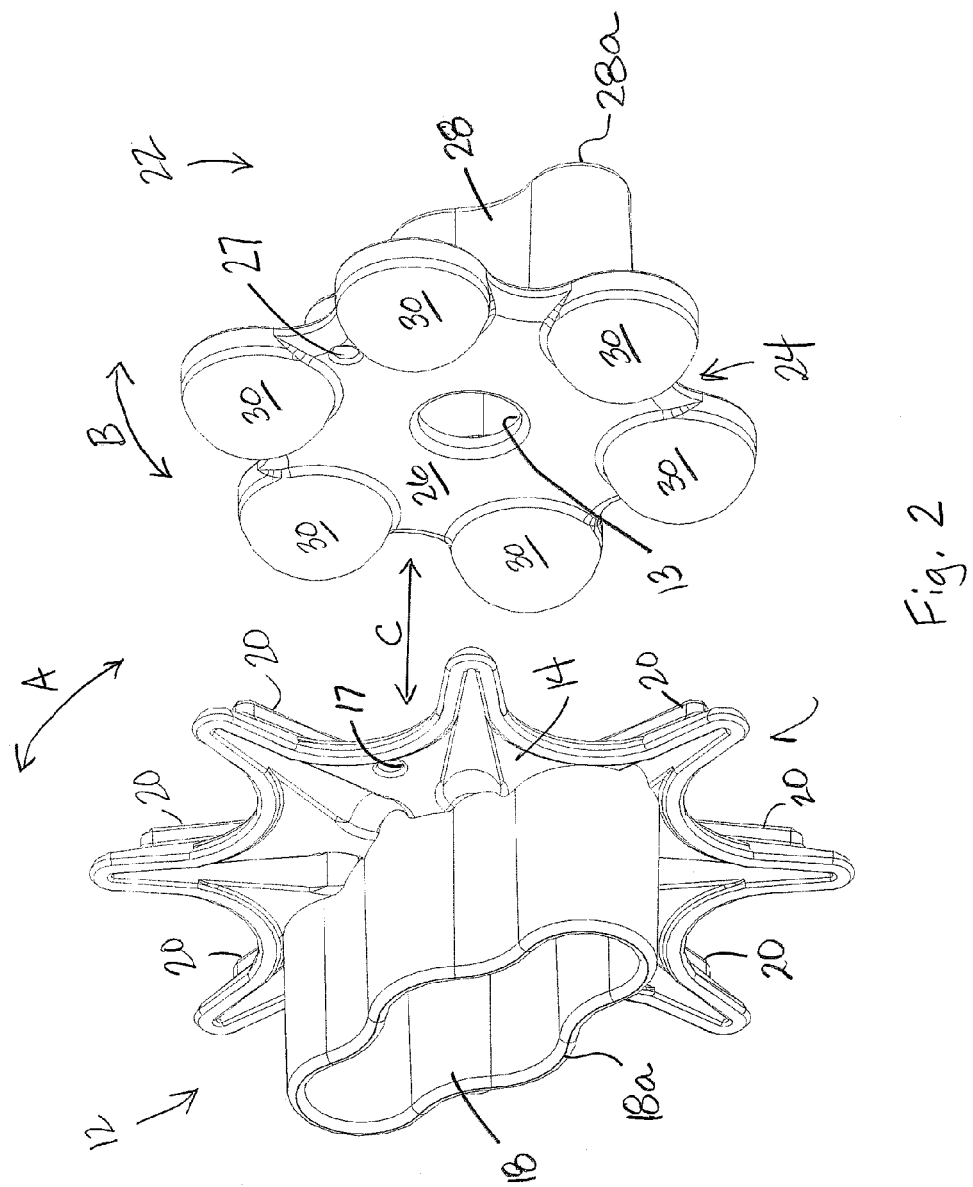
FIG. 2 is a second perspective view of the buck rattle call.
Figure 5B:
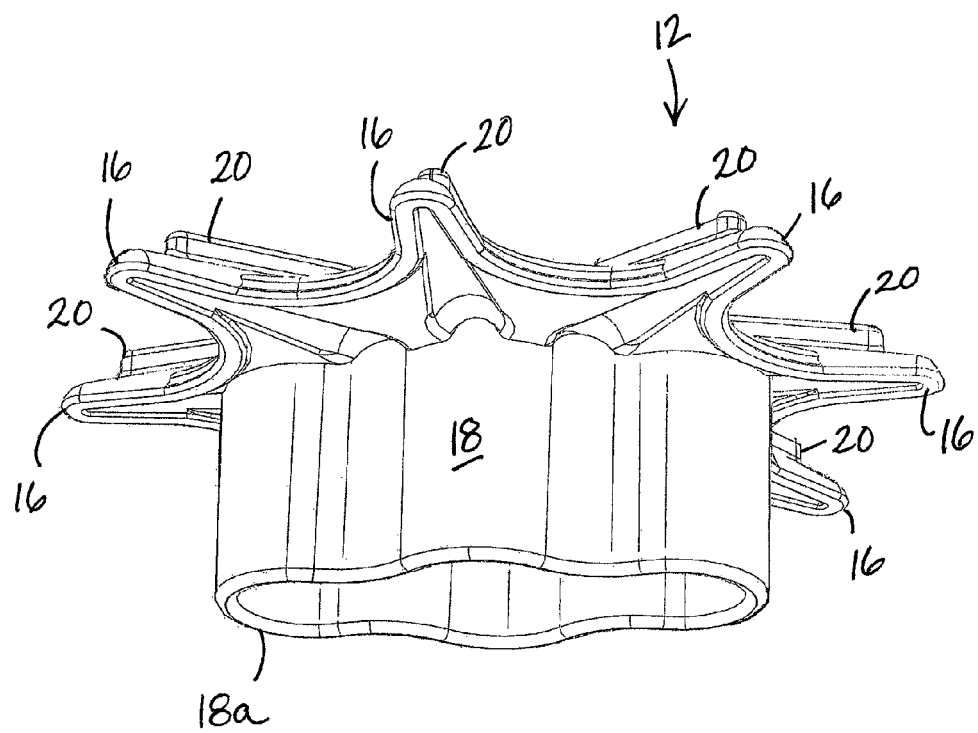
FIG. 5b is a lower perspective view of the rib bearing member.
Figure 6:
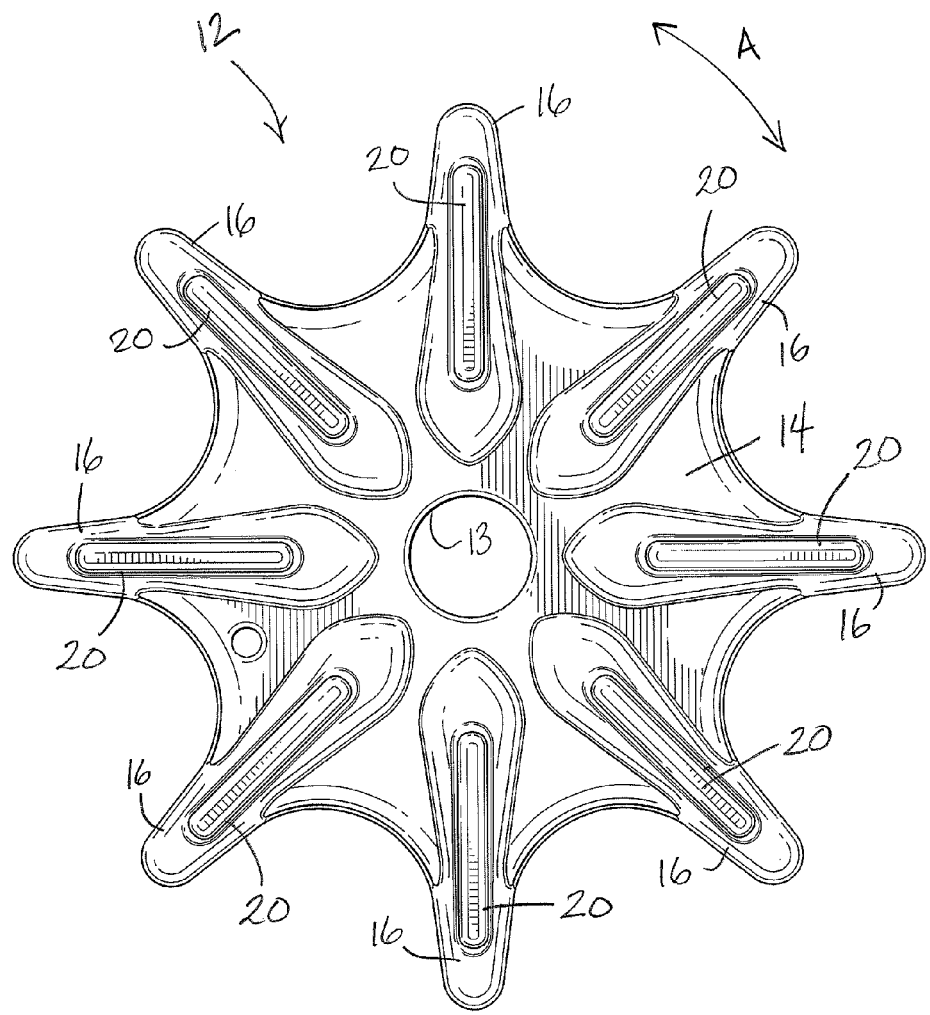
FIG. 6 is a top plan view of the rib bearing member.

Looking to FIGS. 1-4b, a buck rattle call 10 is described herein that includes two sound members 12, 22 to create a sound mimicking the sounds of two antler bearing animals (namely, bucks) in combat. Each sound member 12, 22 has a specific geometry that, when properly manipulated with the opposing sound member 12, 22, will produce a sound similar to that made by fighting bucks, namely, the sound commonly made during rut. More specifically, the buck rattle call 10 includes a compact rib bearing member 12 and a compact knob bearing member 22 that may be held in the user's hand or hands to generate noise as desired.

Looking to FIGS. 5a-7, the first sound member 12, or rib bearing member, includes a rib plate 14, having an upper surface and a bottom surface, with a first aperture 13 traversing the rib plate 14, generally in a central position. In the illustrated embodiment, the rib plate 14 includes a series of arms 16 that extend radially outward from the central aperture 13 (see FIG. 6). Looking to FIGS. 6 and 7, a primary or receiving handle 18 is affixed centrally to the lower surface of the rib plate 14 around the first aperture 13. In the illustrated embodiment, the handle 18 is a wall surrounding an empty space, and has one edge connected to the rib plate 14 and an opposing free edge 18a. Furthermore, one or more ribs 20 extend upward from the upper surface of the rib plate 14 along one or more arms 16 of the rib plate 14. The arms 16 and ribs 20 may be of varying thicknesses to produce a variety of tones similar to the sound made when bucks are sparing, as described herein. Furthermore, it is to be noted that the rib plate 14 may have other shapes, such as circular disc without any arms, that simply operates as a base for the ribs 20 thereupon.

Figure 13:
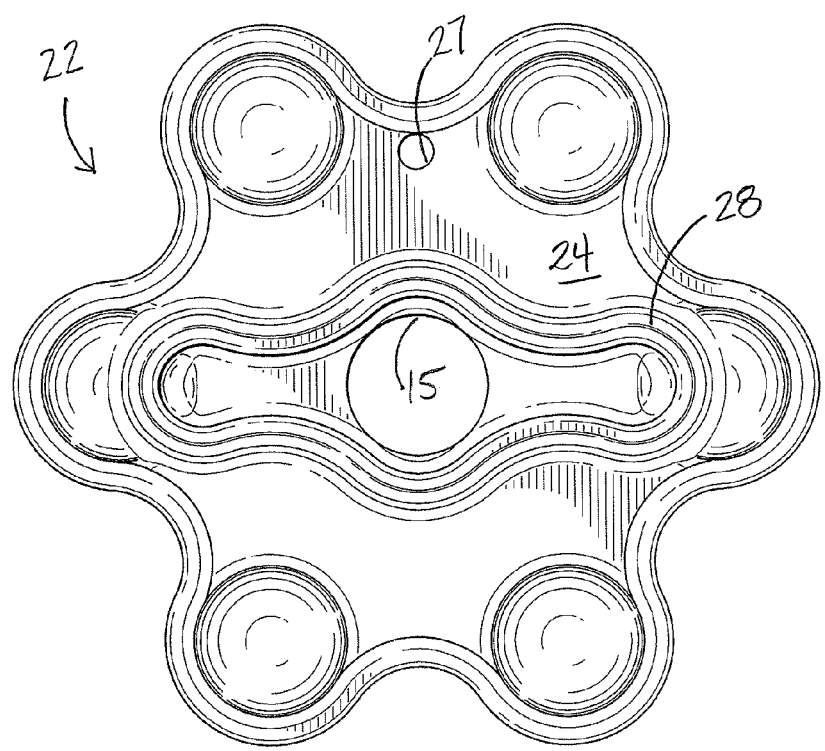
FIG. 13 is a bottom view of the knob bearing member.
Figure 14:
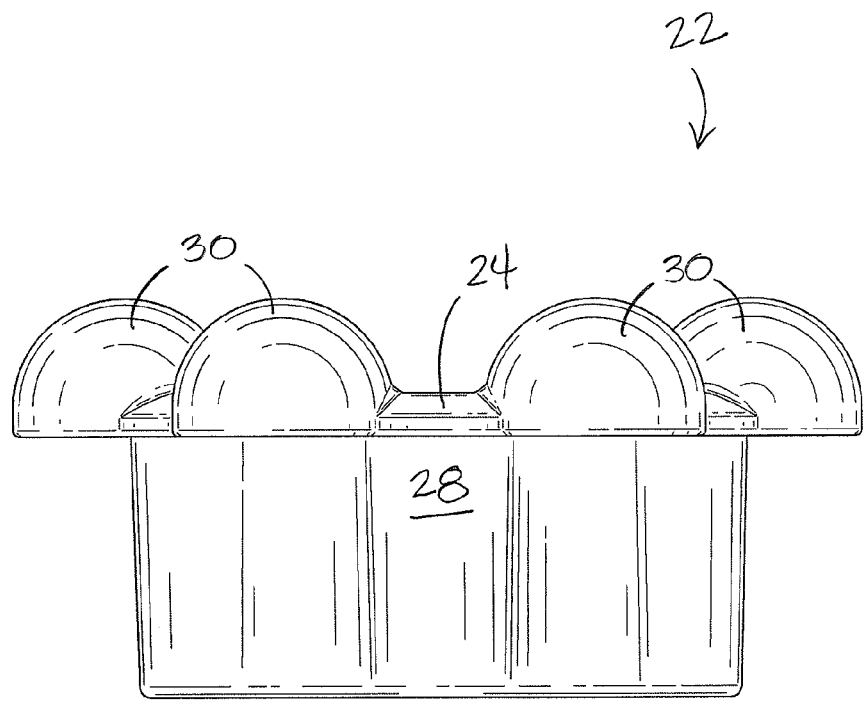
FIG. 14 is a front elevational view of the rib bearing member, the front view being substantially the same as the rear view.
Figure 15:
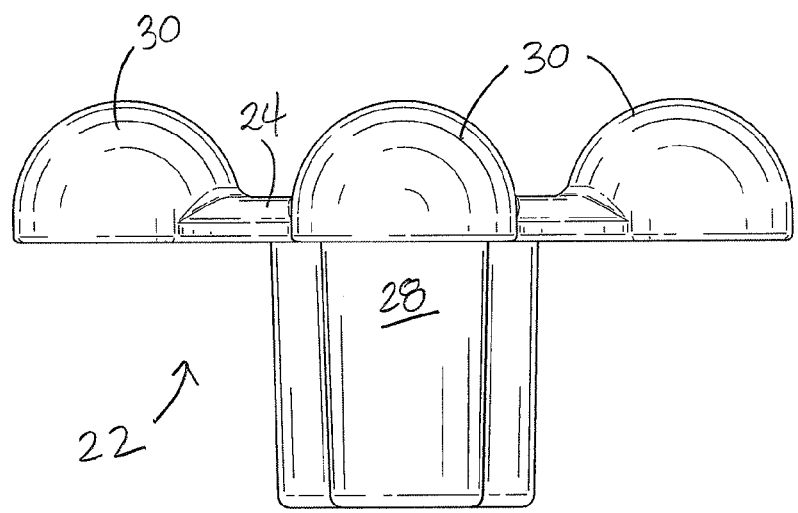
FIG. 15 is a first side elevational view of the rib bearing member, the first side view being substantially the same as the second side view.
Figure 16:
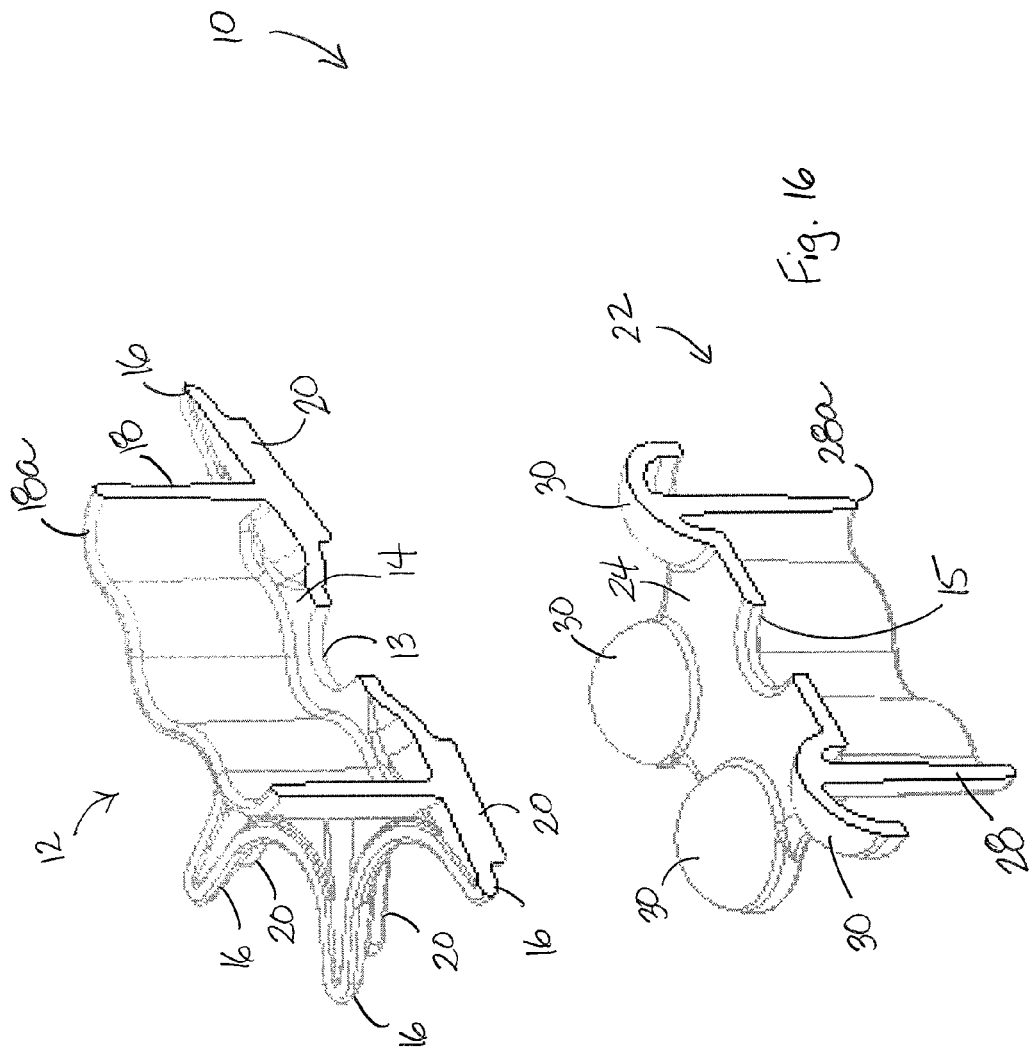
FIG. 16 is a sectional perspective view of the buck rattle call.
Figure 17:
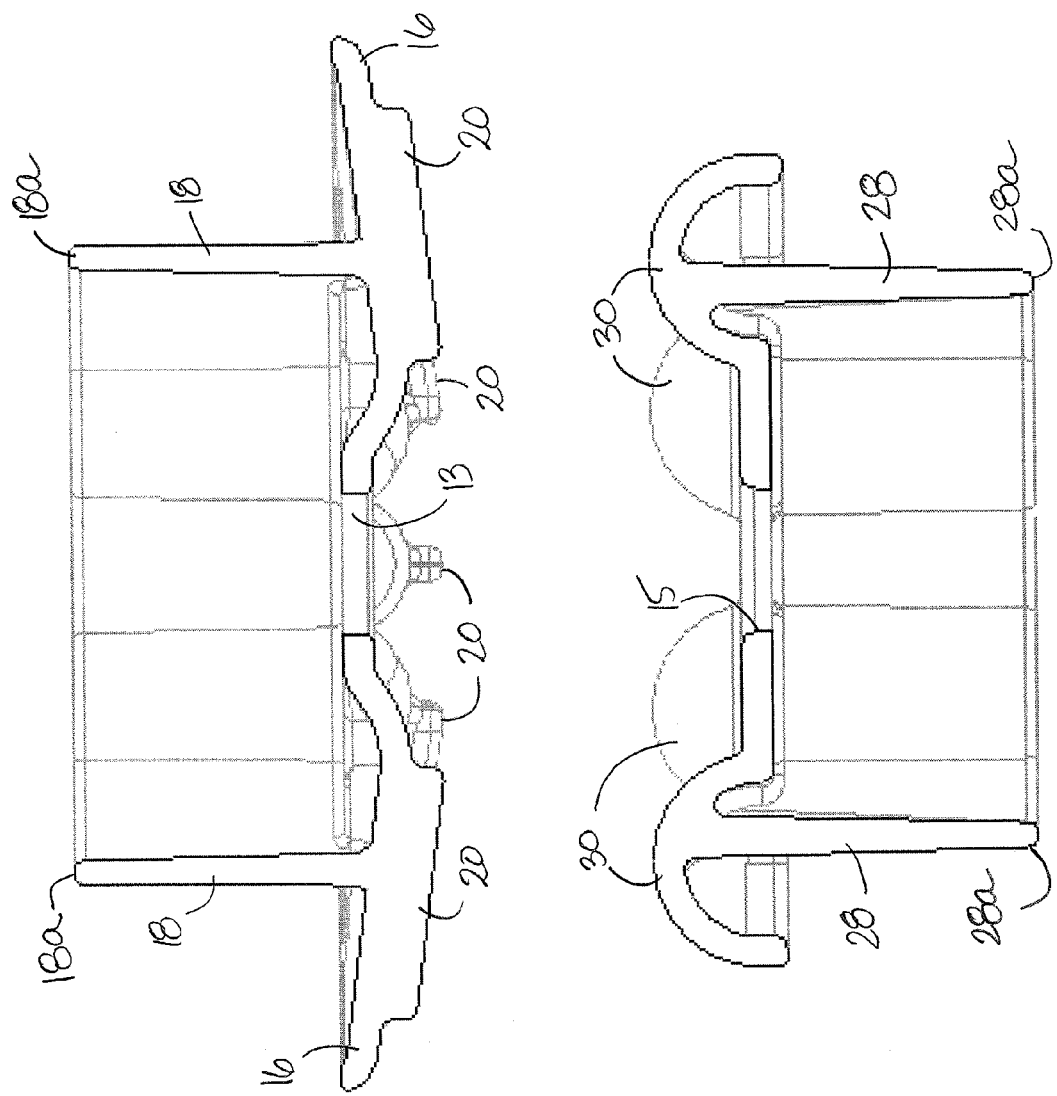
FIG. 17 is a side elevational perspective view of the buck rattle call.

Looking to FIGS. 10-15, the second sound member 22, or knob bearing member, includes a knob plate 24 having an upper surface and a lower surface, with a second aperture 15 traversing the knob plate 24, again generally in a central location. Referring specifically to FIGS. 14 and 15, a secondary or engaging handle 28 is affixed to the lower surface of the knob plate 24 surrounding the second aperture 15, and a series of bumps or protrusions 30 ("knobs") extend upwardly along the upper surface of the knob plate 24. In the illustrated embodiment, the handle 28 is a wall surrounding an empty space, and has one edge connected to the knob plate 24 and an opposing free edge 28a. The protrusions 30 are positioned around the central aperture 15 of the knob plate 24 on the side opposite the handle 28. In the embodiment illustrated, the protrusions 30 are located along the outer edge of the plate 24 and evenly disposed radially about the central aperture 15. The protrusions 30 may be of varying thicknesses (the thickness of the protrusions 30 being illustrated in FIGS. 16 and 17) and/or size to produce a plurality of tones when struck by the first sound member 12 to attract animals as desired by the user. Furthermore, the protrusions 30 shown in the drawings have a generally spherical or semi-spherical shape, although it is noted that other shapes may be incorporated into the knob sound member 22 as desired.

Figure 7:
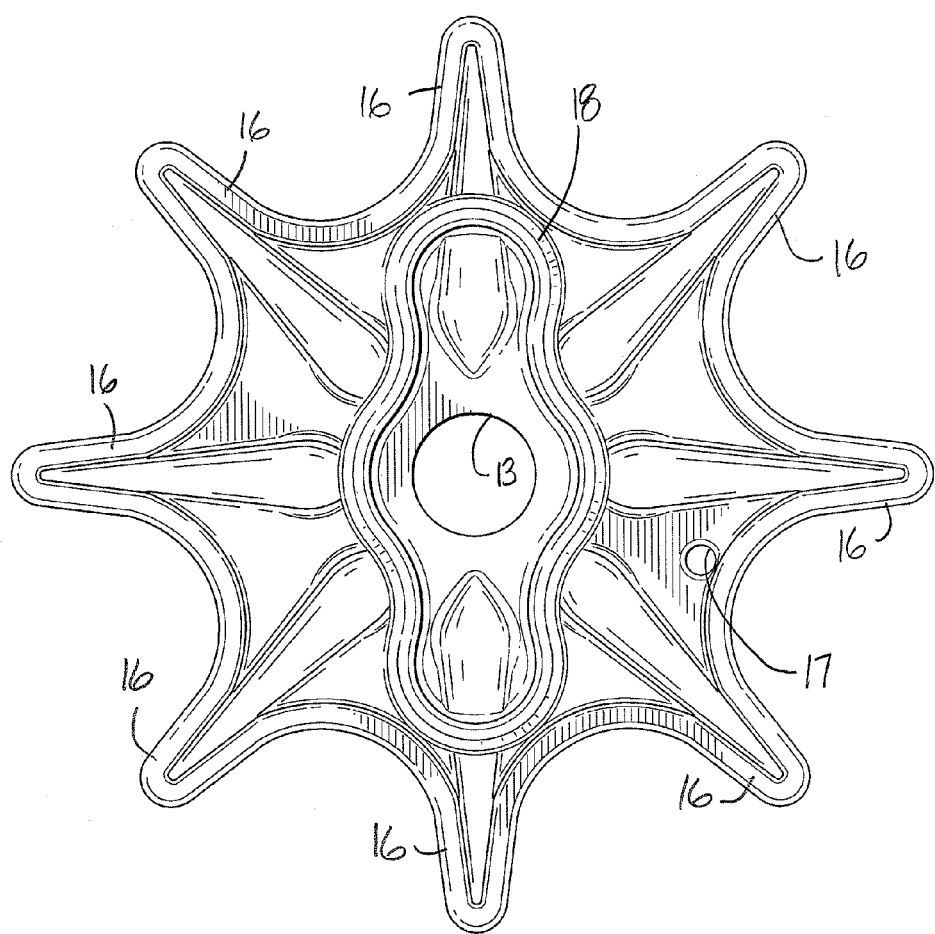
FIG. 7 is a bottom view of the rib bearing member.
Figure 10:
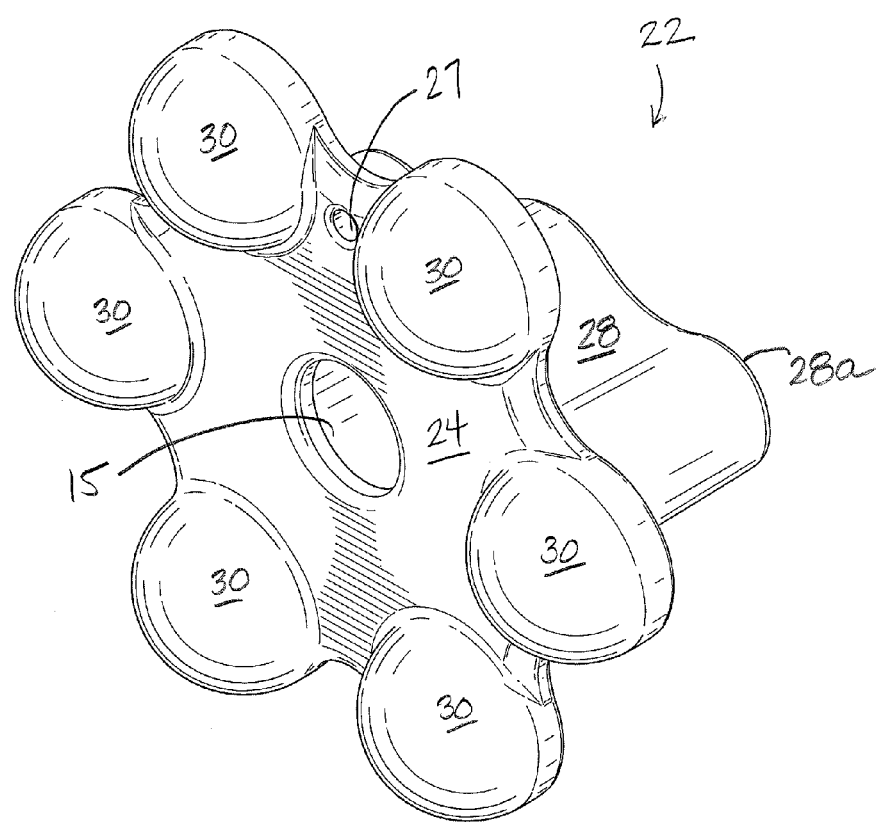
FIG. 10 is a top perspective view of the knob bearing member.
Figure 11:
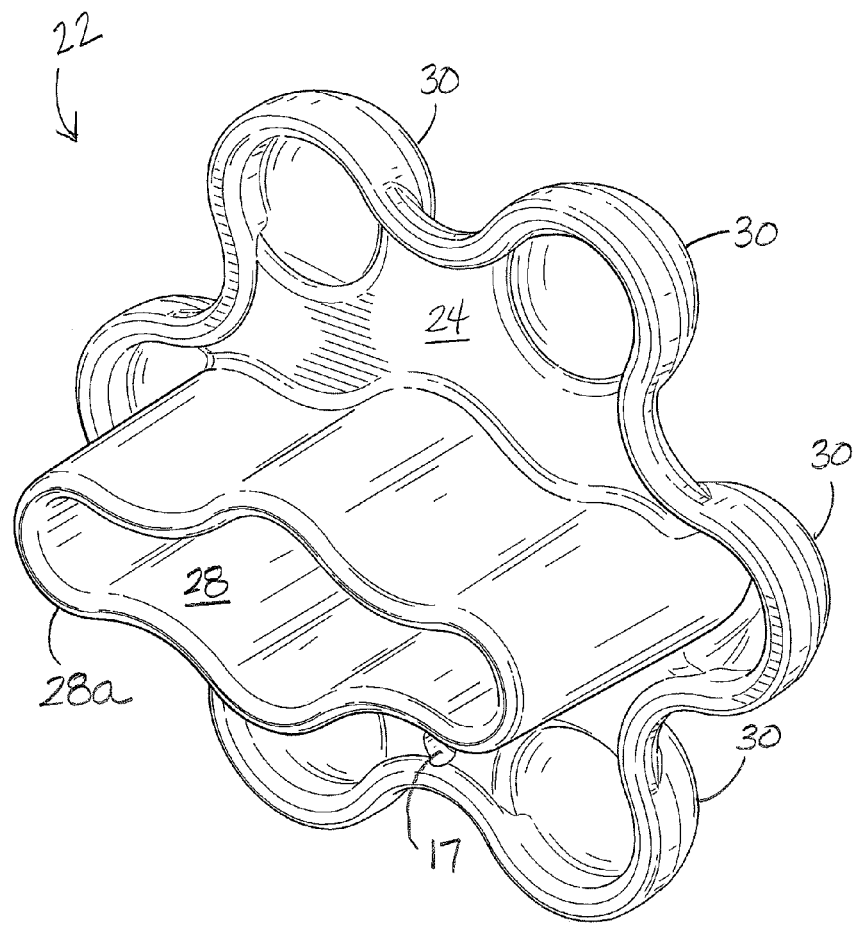
FIG. 11 is a bottom perspective view of the knob bearing member.
Figure 12:
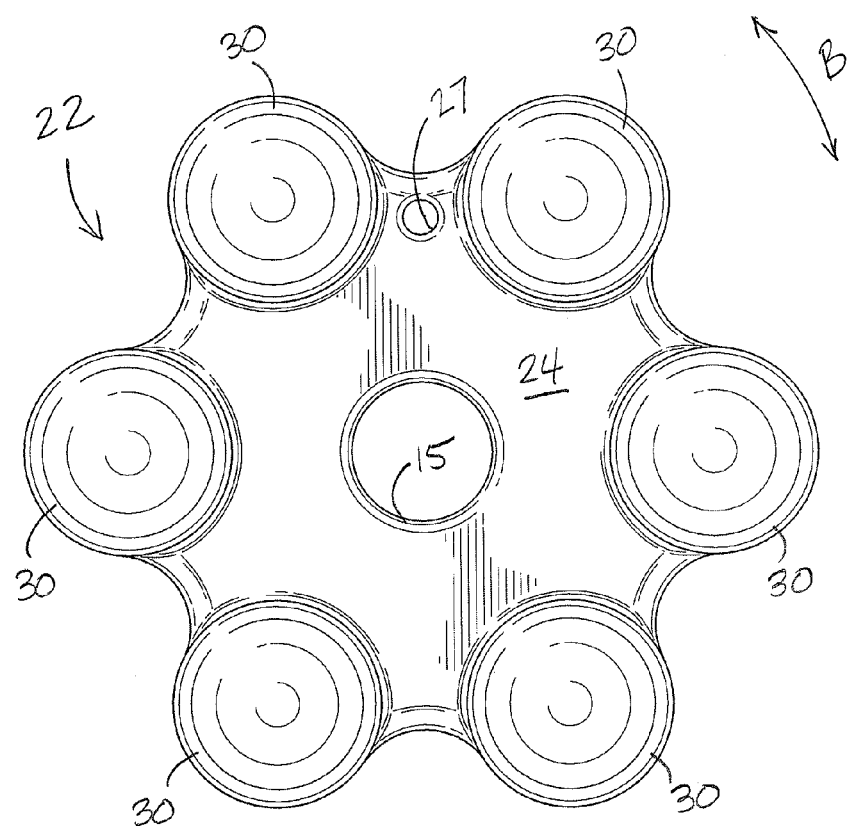
FIG. 12 is a top perspective view of the knob bearing member.
Figure 18:
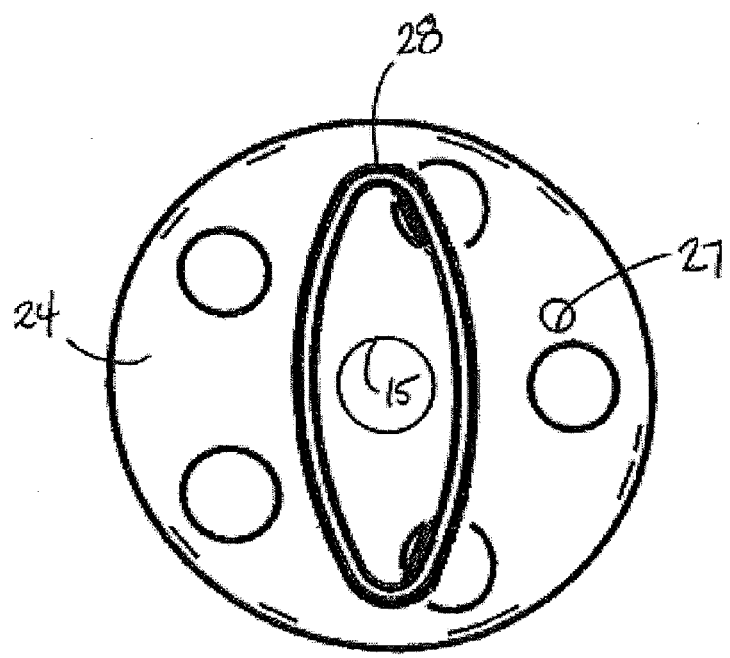
FIG. 18 is a bottom view of another embodiment of the knob bearing member.
Figure 19:
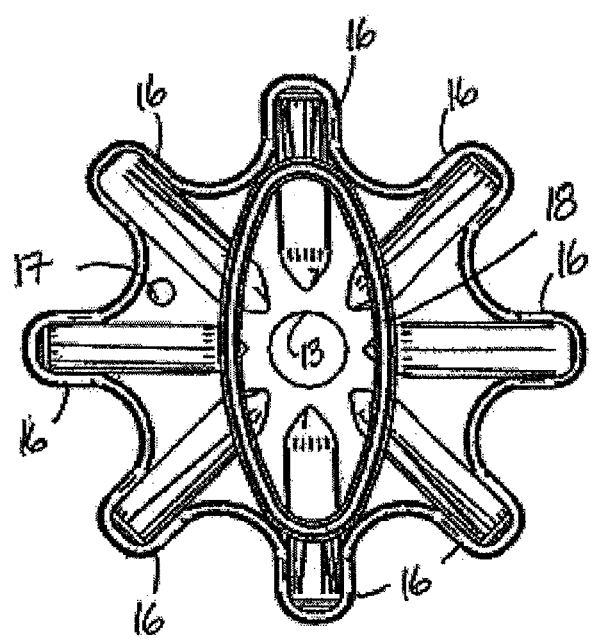
FIG. 19 is a bottom view of another embodiment of the rib bearing member.

As described above, the primary and secondary handles 18, 28 for each sound member 12, 22 are located on the lower side of the first rib plate 14 and the second knob plate 24, respectively, for the user to grip. That is, the user is able to grip the respective handles 18, 28 to hold each sound member 12, 22 to draw the upper surfaces of the rib and knob plates 14, 24 into contact with each other as described herein. When the rattle call 10 is not in use, these handles 18, 28 may nest inside of each other for compact storage of the call 10. That is, the handles 18, 28 are hollow tubes having similar outlines or perimeters (as shown in FIGS. 7 and 13), but the outer perimeter of one of the handles 18, 28 is slightly smaller than the other handle 18, 28. Referring to FIGS. 3a-4b, the engaging handle 28 may be slid or inserted in the receiving handle 18 for a snug engagement that prevents or reduces in noise produced by the sound members 12, 22 in this mating arrangement. Furthermore, in the embodiment shown in FIGS. 7 and 13, the handles 18, 28 have a substantially ergonomic curved perimeter to permit easy engagement of one handle 18, 28 with the user's hand. Note that other shapes may be incorporated into the design as desired, such as a substantially oval shape as illustrated in FIGS. 18 and 19, or even a rectangular shape (not illustrated).

To generate the desired noise with the buck rattle call 10, the user will typically hold the first handle 18 in one hand and the second handle 28 in the other hand. Looking to FIGS. 1 and 2, the user will then crash the two plates 14, 24 in a lateral direction C against each other to make a first sound. Further, the user will also erratically rotate the plate faces 14, 24 against each other in clockwise and counter clockwise directions (shown as directions A and B), such that the ribs 20 and the counterpart protrusions 30 will engage each other to create a second sound of two bucks fighting. In particular, by including multiple ribs 20 and multiple protrusions 30 on the sound members 12, 22, the user is able to create a sound similar to multiple tips of the animals' antlers engaging each other when the respective ribs 20 and protrusions 30 come into contact with one another. These sounds may be adjusted by the user by controlling the impact frequency of the contact of the ribs 20 with the bumps 30 as well as the contact of the rib and knob plates 14, 24 against each other as well as the strength of the contact between the rib and knob plates 14, 24.

As the plates 14, 24 engage each other, and the ribs 20 and protrusions 30 engage each other, sound will be generated in the sound chambers 18, 28 as well as in the substantially hollow protrusions 30 of the second sound member 22. The user is able to create and control the noise to attract the desired animals not only by controlling the collisions between the rib and knob plates 14, 24, but also by varying the position of the user's hands at the outermost opening 18a, 28a of the handles or sound chambers 18, 28. That is, the handles 18, 28 serve as first and second sound chambers for the rattle call 10, and the position of the user's hands proximate the openings 18a, 18b allows the user to control the tone generated in the sound chambers 18, 28. The handles 18, 28 can be manipulated by the location of the user's grip to control the tone quality and volume of the noise, thus giving the user great flexibility in accurately reproducing the sound of fighting bucks. Furthermore, the volume produced by the sound members 12, 22 is controlled by changing the force with which the members 12, 22 collide and the covering of the open ends 18a, 28a of the sound control members 18, 28. Thus, the buck rattle call 10 mimics the realistic sounds of two bucks locked in combat by producing a controlled but substantial volume to bring in bucks from afar. Pulling the two sound members 12, 22 apart and hitting them together while twisting in a clockwise and counter clockwise motion will produce realistic rattle sound.

The buck rattle 10 benefits from its compact size and ease of manipulation. Each handle 18, 28 is designed to fit easily in the user's hands, and the sound members 12, 22 may be small enough to be stored in a holster or pocket when not in use. The two sound members 12, 22 may be tethered by a bungee lanyard or similar connecting cord 19 that may extend through connecting apertures 17, 27 in the respective plates 14, 24 (see FIGS. 3*b* and 4*b*). The use of a cord 19 permits the user to easily store the call 10, such as by draping the plates across the rest of a tree stand to provide quick access to the buck rattle call 10 by an outdoorsman. When not in use, the sound members 12, 22 are nested with each other via the sound chambers/handles 18, 28 as described above (see FIGS. 3*a* and 4*a*). Furthermore, the bungee 19 may be stretched around the plates 14, 24 to hold them together, as shown in FIG. 4*b*, thus preventing any inadvertent noise between the sound members 12, 22 as the user is carrying the rattle 10.

Thus, the buck rattle call 10 provides easy and safe manipulation by the user, with no opportunities for the user to smash or injure the user's fingers as with other deer calls. The rattle call 10 provides realistic reproduction of the sound created by fighting bucks due to the plurality of thicknesses of associated spheres 30 and ribs 20. The rattle 10 provides sound chambers 18, 28 that can be controlled by grip position giving the user the ability to vary tone and/or volume of rattle sound.

It is noted that the spheres 30 on the plate 22 could be replaced with cones or any other shape that would create a protrusion used for engagement with the ribs 20 of the opposite plate 14. Additionally, the number of ribs 20 and/or spheres 30 on each plate 14, 24 could be varied to produce different impact frequencies by users. For example, in the embodiment illustrated in FIGS. 1-2, there are six ribs 20 and six spheres 30, but in the embodiment illustrated in FIGS. 18-19, there are five ribs 20 and spheres 30 on each plate 14, 24.

An advantage to this design is the compact size, accurate reproduction of buck sparring sound, safe operation, tone control via the hand position on the sound chambers 18, 28, and integral bungee 19 that serves as a restraining strap or a hanging strap.

Additional parts could be added to close the open ends 18*a*, 28*a* of the sound chambers 18, 28 incorporating a sliding aperture that or closing mechanism that would give tonal presets for a specific tone quality.

In another embodiment, the sound chambers 14, 24 could be removed and replaced with solid handles. This embodiment would eliminate the ability to control the tone quality. The call 10 would still function, but would give the end user less control over the sound quality.

Figure 20:
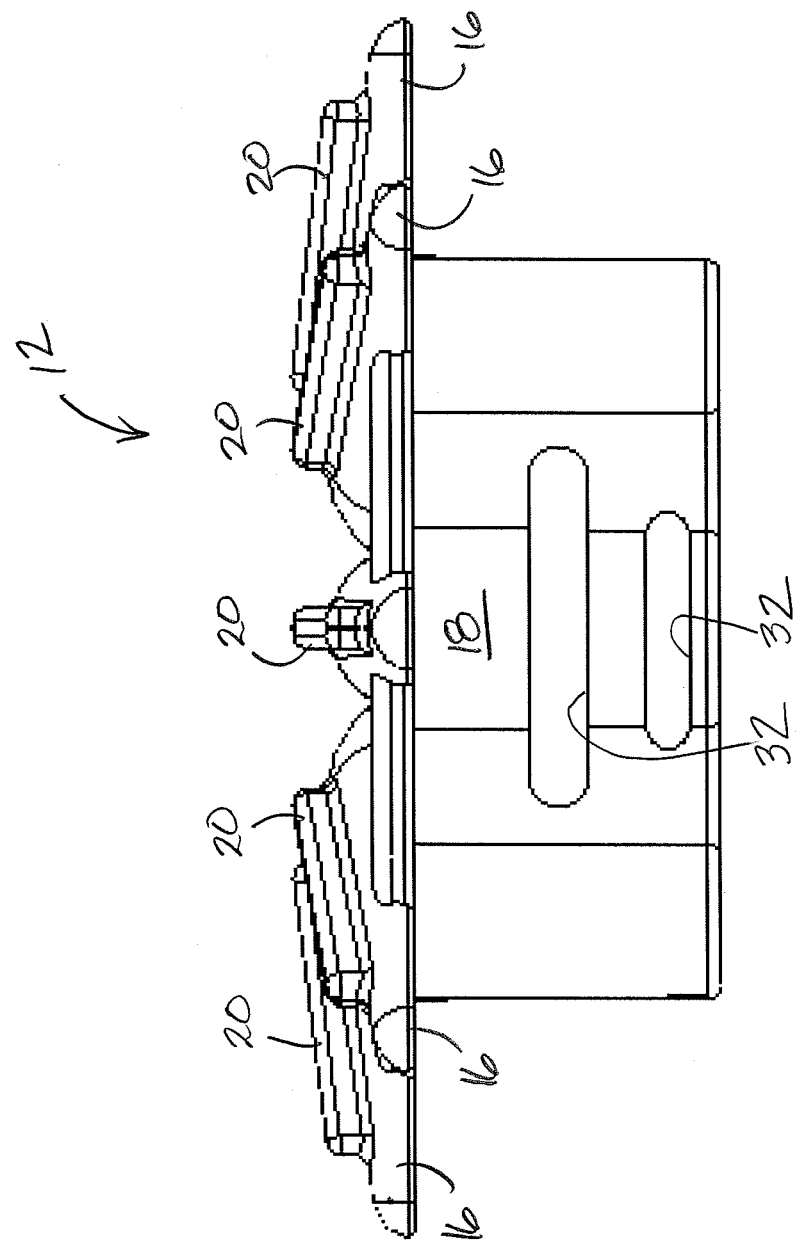
FIG. 20 is a side elevational view of another embodiment of the rib bearing member including slots to receive a connector.

In addition, looking to FIG. 20, a series of support slots 32 may be included in one or more handles 18 of the sound members 12, 22. The support slots 32 are used to allow a connector strap or other similar cord (such as the connecting cord 19) to traverse one of the sound members (in the illustrated case, the rib bearing member 12) and affix the sound member 12 to a person or object, such as affixing the sound members 12 to the leg of the user, to allow one handed operation of the buck rattle call 10. In such an embodiment, one sound member 12, 22 is affixed to the desired person/object (referred to as the "affixed sound member"), and the other sound member 12, 22 is grasped by the user's hand (referred to as the "free sound member"). Consequently, the user is able to engage the affixed sound member 12 with the free sound member 22 to create the desired sound using only one hand.

An improvement of the buck rattle call 10 over other calls is that it will function in all weather conditions. In addition, the buck rattle call 10 could be made of various materials that would generate the desired sound and tone. While not limited to any specific material, a buck rattle call 10 made of glass filled nylon or polycarbonate works well to generate a sound similar to the horns of two animals engaging each other. In addition, the thickness of the plates 14, 24 and the ribs 20 or protrusions 30 may be varied to adjust the noise created by the call 10 as the plates 14, 24 engage each other.

Figure 21:
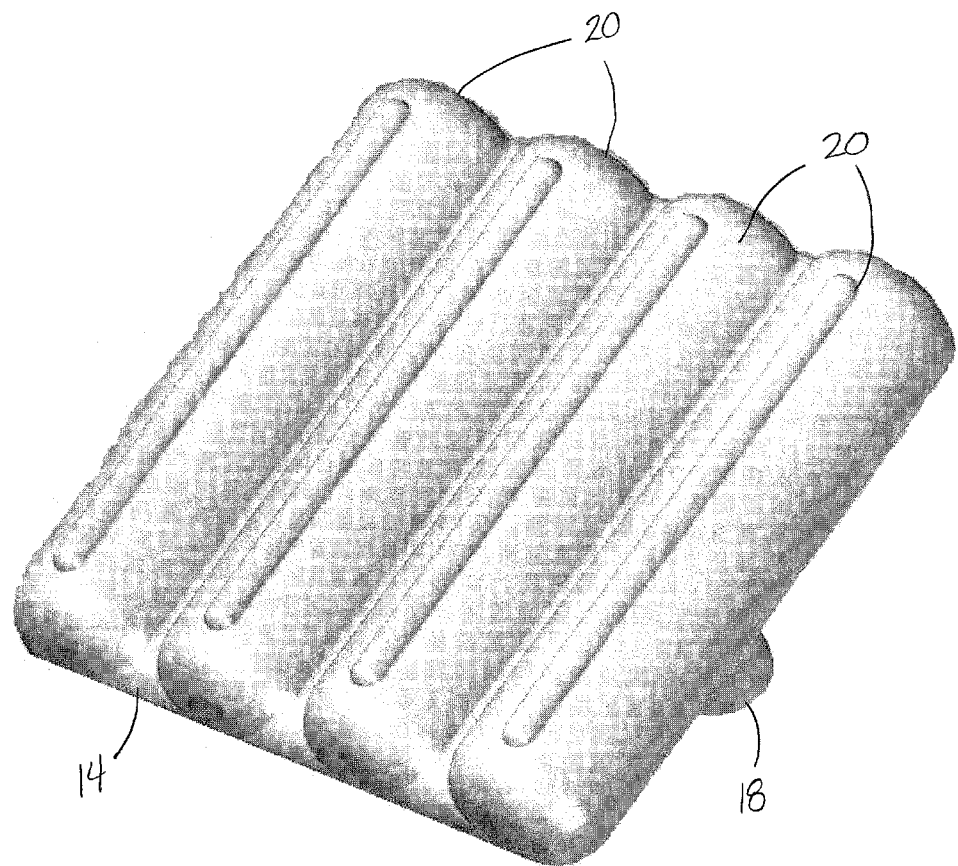
FIG. 21 is a perspective view of a further embodiment of the rib bearing member.

Finally, it is noted that the geometry of the ribs 20 and/or spheres 30 on the plates 12, 22 could be changed to horizontal or vertical spacing rather than radial spacing and still be able to generate the desired sound. That is, although the sound members 12 have been shown as having substantially round plates 14, 24, it is foreseen that other shapes and configurations may be implemented for desired results as well. In particular, FIG. 21 illustrates a rib bearing member 12 that has a rectangular plate 14 with a series of ribs 20 extending lengthwise along the plate in a parallel fashion. Such an embodiment continues to allow the user to engage the knob bearing plate 24 and create a desired sound for attracting animals.

Having thus described exemplary embodiments of a RATTLE CALL, it should be noted by those skilled in the art that the within disclosures are exemplary only and that various other alternatives, adaptations, and modifications may be made within the scope of this disclosure. Accordingly, the invention is not limited to the specific embodiments as illustrated herein, but is only limited by the following claims

What is claimed is:

1. A rattle call for use in luring an antler-bearing game animal to a hunter comprising:
    a rib disc with an upper side and a lower side;
    a receiving handle, connected to said lower side of said rib disc, comprising a first wall engaging and extending away from said rib disc to a distal edge to create a first sound chamber having an opening facing away from said rib disc adapted to permit control of the tone generated in said first sound chamber by the placement and grip of a user's hand;
    a plurality of ribs extending from said upper side of said rib disc;
    a knob disc with an upper side and a lower side;
    an engaging handle, connected to said upper side of said knob disc, comprising a second wall engaging said knob disc and extending away from said knob disc to a distal edge to create a second sound chamber having an opening adapted to permit control of the tone generated in the second sound chamber by the placement and grip of a user's hand; and
    a plurality of knobs extending from said lower side of said knob disc for generating a rattle sound when said ribs strike said knob disc and said knobs.

2. The rattle call as described in claim 1 wherein said rib disc has defined therein a substantially centrally located first aperture communicating with said first sound chamber, said plurality of ribs extending radially around said first aperture.

3. The rattle call as described in claim 2 wherein said knob disc has defined therein a substantially centrally located second aperture communicating with said second sound chamber, said plurality of protrusions extending around the edge of said knob disc in a position commensurate with said plurality of ribs.

4. The rattle call as described in claim 2 wherein said rib disc comprises a plurality of arms extending outwardly from said first aperture to engage said ribs or said rib disc to generate a desired sound.

5. The rattle call as described in claim 1, wherein each said knob is substantially spherical and comprises a polycarbonate material.

6. A method for attracting an antler bearing game animal to a desired location of a user holding a game call with the user's hands, the method comprising the steps of
   a. engaging a primary handle of a rib bearing sound member with one of the user's hands, said rib bearing sound member further comprising a rib plate having an upper surface and a lower surface, said rib plate including a plurality of ribs extending from said upper surface away from said rib plate, and said primary handle including a first wall having a proximal edge engaging said rib disc and extending away from said rib disc to a distal edge defining an opening for the primary handle; and
   b. engaging a secondary handle of a knob bearing sound member with the user's other hand, said knob bearing sound member further comprising a knob plate having an upper surface and a lower surface said knob plate including a plurality of knobs extending from said upper surface away from said knob plate and said secondary handle including a second wall having a proximal edge engaging said knob plate and extending away from said knob plate to a distal edge to define an opening for the secondary handle; and
   c. drawing said upper surface of said rib plate and said upper surface of said knob plate into engagement to generate a desired noise mimicking the contact made by the antler bearing game animals; and
   d. varying the position of the user's hands at the openings defined by the distal edges of said first or second walls to control the tone generated in the sound chambers.

7. The method as described in claim 6 wherein step c) further comprises the step of selectively rotating said rib plate relative to said knob plate while said plates are parallel to each other to generate the desired noise or crashing the upper surface of said rib plate in a lateral direction with said upper surface of said knob plate to generate the desired noise.

8. The method as described in claim 6, wherein step a) comprises threading a connector through a connector slot in said primary handle to affix said rib bearing member to a desired location.

9. A rattle call for use in luring an antler-bearing game animal to a desired location comprising:
   a first sound member and second sound member, said first and second sound member each comprising a plate with an opposing side and a handle side, and a handle connected to said handle side of said plate, each handle comprising a wall having a perimeter, each wall affixed to said plate and extending away from said plate to a distal edge to create first and second open ended sound chambers, positioned for selective engagement by the hands of a user to control the tonal quality of sound from said sound chambers,
   said first sound members including a plurality of ribs extending from said opposing side of said plate of said first member; and
   said second sound member including a plurality of knobs extending from said opposing side of said plate of said second member for generating a rattle sound when said ribs contact said knobs or said plate of said second sound member.

10. The rattle call as described in claim 9 wherein said plate of each said first member and said second member has defined therein a substantially centrally located aperture extending therethrough in communication with said respective sound chambers.

11. The rattle call as described in claim 9 wherein one of said handles comprises a first wall having a first distal edge with a first perimeter and the second of said handles comprises a second wall having a second distal edge with a second perimeter, wherein said second perimeter of said engaging handle is substantially commensurate with said first perimeter of said receiving handle.

12. The rattle call as described in claim 11 wherein said second perimeter is smaller than said first perimeter to slide said second handle into closed engagement with said first handle.

13. The rattle call as described in claim 11 wherein said first perimeter is smaller than said second perimeter to slide said first handle into closed engagement with said second handle.

14. The rattle call as described in claim 11 further comprising:
   a connecting aperture through each said plate; and
   a connecting cord extending through said connecting apertures to join said sound members into a stationary inoperative relationship.

15. The rattle call as described in claim 9 wherein one of said plates comprises a plurality of arms extending outwardly from the center of the plate to support said ribs.

16. The rattle call as described in claim 9, wherein each said knob is substantially spherical.

17. An apparatus for luring antlered animals by sound, comprising:
   a. a first sound producing member including a plurality of protrusions formed on a face thereof and a hollow handle integrally formed with and extending behind said face, said handle opening outwardly from said face and defining an open-ended sound chamber there within;
   b. a second sound producing member including a plurality of secondary protrusions formed on a face thereof and a second hollow handle integrally formed with and extending behind said face, said handle opening outwardly from said face and defining a second open-ended sound chamber therewithin; wherein said protrusions and sound chamber are configured to create sound mimicking the sound of antlers clashing when said sound producing members are crashed together.

18. An apparatus as defined in claim 17 wherein said first and second hollow handles are sized such that one handle can fit within the other when said apparatus is not in use to generate sounds.

19. An apparatus as defined in claims 18 wherein said first and second sound chambers are closed by the respective faces of said sound producing members and are open ended distal said faces.

20. An apparatus for luring antlered animals by sound, comprising:
   a. a first sound producing member including a plurality of protrusions formed on a face thereof and a hollow handle integrally formed with extending behind said face, said handle defining a sound chamber having an opening outwardly of said face such that a hand of a user may selectively grip said hollow handle and cover said opening;
   b. a second sound producing member including a plurality of secondary protrusions formed on a face thereof and a second hollow handle integrally formed with and extending behind said face, said second handle defining a second sound chamber having an opening outwardly of said face such that a second hand of a user may grip said second hollow handle and selectively cover said opening to control the tonal quality of a sound created when said sound producing members are crashed together.

21. An apparatus as defined in claim 20 wherein said first and second hollow handles are sized such that one handle can fit within the other when said apparatus is not in use to generate sounds.

\* \* \* \* \*